US006478214B1

(12) United States Patent
Rigal et al.

(10) Patent No.: US 6,478,214 B1
(45) Date of Patent: Nov. 12, 2002

(54) METHOD FOR ASSEMBLING BY DIFFUSION WELDING A MARTENSITE STAINLESS STEEL AND A COPPER ALLOY AND RESULTING BIMETAL ELEMENT

(75) Inventors: Emmanuel Rigal, Saint Martin le Vinoux (FR); Hélène Burlet, Coublevie (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/701,436

(22) PCT Filed: Jun. 22, 1999

(86) PCT No.: PCT/FR99/01493

§ 371 (c)(1),
(2), (4) Date: Nov. 29, 2000

(87) PCT Pub. No.: WO99/67047

PCT Pub. Date: Dec. 29, 1999

(30) Foreign Application Priority Data

Jun. 23, 1998 (FR) .............................. 98 07901

(51) Int. Cl.[7] .............................. B23K 20/02
(52) U.S. Cl. ...................... 228/193; 228/195
(58) Field of Search ................... 228/194, 193, 228/234.1, 195, 196, 197

(56) References Cited

U.S. PATENT DOCUMENTS

| 2,758,368 | A |   | 8/1956 | Ulam et al. |
|---|---|---|---|---|
| 3,298,803 | A |   | 1/1967 | Ulam et al. |
| 4,090,873 | A |   | 5/1978 | Takamura et al. |
| 4,194,672 | A | * | 3/1980 | Uto et al. |
| 4,252,263 | A |   | 2/1981 | Houston |
| 4,465,224 | A | * | 8/1984 | Nicolozakes et al. |
| 5,147,722 | A | * | 9/1992 | Koslow |
| 5,161,179 | A | * | 11/1992 | Suzuki et al. |
| 5,615,826 | A | * | 4/1997 | Dixon et al. |
| 5,642,853 | A | * | 7/1997 | Lee |
| 5,812,925 | A | * | 9/1998 | Ecer |
| 6,059,175 | A | * | 5/2000 | Hamada et al. |

FOREIGN PATENT DOCUMENTS

| EP | 0001173 | 9/1978 |
|---|---|---|
| EP | 0490800 | 12/1991 |

OTHER PUBLICATIONS

"Solid–state diffusion bonding of alumina dispersion–strengthened copper to 316 stainless steel", Journal of Nuclear Materials, 5 pages Nishi et al. 1994.

* cited by examiner

Primary Examiner—M. Alexandra Elve
Assistant Examiner—Jonathan Johnson
(74) Attorney, Agent, or Firm—Burns, Doane, Swecker & Mathis L.L.P.

(57) ABSTRACT

The present invention relates to a diffusion welding assembly process between a martensitic stainless steel and a copper alloy, and in particular, to an assembly process of a martensitic stainless steel component with a component comprising copper. Said process may be used for example to produce a bimetal part designed to operate at high temperatures. It particularly comprises a step consisting of degreasing and stripping the surfaces of the components to be assembled, a step consisting of placing the degreased and stripped surfaces of the components to be assembled in direct contact and a step consisting of diffusion welding assembly.

21 Claims, No Drawings

METHOD FOR ASSEMBLING BY DIFFUSION WELDING A MARTENSITE STAINLESS STEEL AND A COPPER ALLOY AND RESULTING BIMETAL ELEMENT

DISCLOSURE

This application is a national phase of PCT/FR99/01493 which was filed on Jun. 22, 1999 and was not published in English.

FIELD OF THE RELATED ART

The present invention relates to a diffusion welding assembly process between a martensitic stainless steel and a copper alloy, and in particular, to an assembly process of a martensitic stainless steel component with a component comprising copper.

Diffusion welding is a technique used to assemble solid phase components, i.e. without melting through the simultaneous application of a high temperature and pressure.

This technique may be used for example to produce a bimetal part designed to operate at high temperatures. The martensitic stainless steel component, or part, plays a role in the mechanical strength and/or wear and corrosion resistance of the part, and the copper or copper alloy component, or part, acts as a thermal well enabling the cooling of said part. Therefore, said two components must be assembled to ensure optimum thermal transfer from one component to the other and excellent thermomechanical resistance of the assembly.

Such a bimetal part is useful for example in the glass industry to form a mould, in metallurgy to form a continuous metal strip casting roll, to produce a non-cyclic or single-pole fluid-cooled generator, to produce an X-ray tube, etc.

In addition, the present invention also relates to a process to produce a thermomechanically resistant bimetal part comprising a component made of martensitic stainless steel assembled with a component comprising copper, and a bimetal part that can be obtained using said process.

STATE OF THE RELATED ART

Known steel and copper welding assembly techniques use an intermediate layer or a film of alloy, for example, based on nickel, placed between the steel and the copper to be assembled. Indeed, nickel forms a solid solution with copper and is fully compatible with steels. It ensures a good metal transition between the two materials and forms a barrier preventing the diffusion of copper in the steel. In this way, it reinforces the assembly formed.

In this way, the patent application EP-A-0 001 173 by Mitsubishi Jukogyo Kabushiki Kaisha describes a diffusion welding assembly process between a stainless steel and copper. Said process consists of placing, between the steel and copper to be assembled, an intermediate layer composed of Cr or an Ni—Cr, Cr—Ni or Cr alloy, containing not more than 140 ppm of $O_2$.

The patent application EP-A-0 490 800 describes a diffusion welding assembly process between an 18% Ni GS austenitic cast iron material or 304 type austenitic stainless steel and a copper alloy material.

The document "Journal of Nuclear Materials", 212–215 (1994) 1585–1589 by H. Nishi, Y. Muto and K. Sato describes a welding assembly process between a 316 steel and a copper alloy. 316 steel is an austenitic steel comprising 10.25% of Ni by weight and 16.29% of chromium by weight. Chromium is described in this document as an element which weakens the assembly formed.

These documents do not describe a diffusion welding assembly between a copper alloy and a martensitic stainless steel.

The precise microstructure of the assembly, or join, depends on the type of steel and copper used.

In addition, to obtain a martensitic steel, it is necessary after assembly to perform a quench hardening treatment from a high temperature so as to induce the martensitic conversion of the steel. During said conversion, a change of volume takes place in the steel, which induces stress in the copper. This is not the case with austenitic steels. Said stress is added to the differential thermal expansion stress between the two assembled materials, which is much higher in the case of austenitic steels as indicated by the thermal expansion values of the materials presented in table 1 below.

TABLE 1

Thermal expansion values for copper, an austenitic steel and a martensitic stainless steel.

| Material | Copper | Austenitic steel | Martensitic stainless steel |
|---|---|---|---|
| Grade | pure copper | types 304L, 316 | types 430, 416, 420 |
| Composition | — | 16–19% Cr, 6–14% Ni | 13–17% Cr |
| Extension between 20° C. and 727° C. | 1.366% | 1.322% | 0.899% |
| Linear thermal expansion coefficient at 727° C. | $22.4 \times 10^{-6} K^{-1}$ | $21.1 \times 10^{-6} K^{-1}$ | $13.9 \times 10^{-6} K^{-1}$ |

Therefore, in the case of the martensitic stainless steel, the assembly is subject to very severe mechanical, "thermal shock" type, strain.

Therefore, the dissipation of said stress without damaging the assembly requires that said assembly is sufficiently resistant.

DESCRIPTION OF THE INVENTION

The present invention relates to an assembly process of a martensitic stainless steel component with a component comprising copper, said process comprising in the following order:

a step consisting of degreasing and stripping the surfaces of the components to be assembled, a step consisting of placing the degreased and stripped surfaces of the components to be assembled in direct contact, and a step consisting of diffusion welding assembly of the surfaces of the components in contact.

Those skilled in the art easily understand that the process according to the invention can be used to assemble one or more martensitic stainless steel components with one of more components comprising copper, respectively.

According to the invention, the martensitic stainless steel component preferentially comprises a nickel concentration less than or equal to 4% by weight, and/or, advantageously and, a chromium concentration greater than or equal to 10% by weight. For example, it may comprise 0.1 to 1% by weight of C, up to approximately 4% by weight of Ni, 10 to 18% by weight of Cr, up to 2% by weight of Mo or W, up to 0.5% by weight of V, up to 1.5% by weight of Mn, up to 1.5% by weight of Si, up to 0.1% by weight of P, up to 0.2% by weight of S, the remainder being composed of iron and impurities.

An example of a martensitic stainless steel which may be used as this component is Z20 CN17-02 steel which comprises 0.2% by weight of C, 1.25 to 2.5% by weight of Ni, 15 to 17% by weight of Cr, 1% by weight of Mn, 1% by weight of Si, 0.04% by weight of P, 0.03% by weight of S, the remainder being composed of iron and impurities.

According to the invention, the component comprising copper may be for example composed of a copper alloy, the matrix of which is not alloyed, i.e. only comprising copper and impurities, according to the standard NF A 51050 not less than 99.8% by weight of copper, or a copper alloy reinforced by oxide dispersion, for which the matrix is preferentially not alloyed.

According to the invention, the components that can be assembled according to the process according to the invention may be of any size or shape. They may, for example, have a volume greater than one $dm^3$ and a thickness of up to a few centimeters. In this way, they may easily have a thickness greater than or equal to 1 mm on their surface to be assembled.

In the process according to the invention, the surface degreasing and stripping step may consist of conventional degreasing and stripping treatments for metal surfaces. The purpose of this step is to obtain clean surfaces, free of grease and oxidation. The grease may be removed from said surfaces, for example, using a solvent or conventional metal degreasing detergent. The stripping may consist of chemical or mechanical stripping, it may for example by performed by means of an acid or basic solution, or by grinding or polishing. According to the invention, the stripping technique may consist of chemical stripping followed by rinsing with water during which the material surface is scrubbed using an abrasive pad with an alumina fibre base, for example. Said treatment may be repeated several times, with the possibility of performing the last rinse with demineralised water.

This list is not exhaustive and it is possible to choose any technique enabling the elimination of traces of pollution and oxidation on the surfaces of the components to be assembled.

For the surface of the martensitic stainless steel component to be assembled, the degreasing solvent may be an organic solvent, for example, a ketone, ether, alcohol, alkane or chlorinated alkene such as trichloroethylene, or a mixture of said substances, etc. A preferred solvent is an equal mixture of ethanol, ether and acetone. Another preferred solvent is trichloroethylene. The chemical stripping may be performed with an acid solution, for example a 10% hydrofluoric acid bath or a mixture comprising 1 to 5% hydrofluoric acid with 30 to 40% nitric acid. The stripping time may for example be 10 seconds to 5 minutes, for example 20 to 30 seconds, at a temperature of 15 to 30° C., for example 20° C. The stripped surfaces may then be rinsed in one or more successive baths of demineralised water, for example.

For the surface of the component comprising copper, the grease may be removed by means of an organic solvent such as those mentioned above, for example using acetone or a ternary acetone-ethanol-ether mixture, preferentially in ⅓, ⅓ and ⅓ proportions. The degreasing of said surface may be followed by an ultrasound treatment for a period of one minute, for example. The surface can then be degreased in ethanol under ultrasound and then dried for example using hot air. Said surface may then be stripped for example using a potassium dichromate bath for example at a concentration of 0.23 to 0.30 mole/liter, sulphuric acid at a concentration for example of 0.1 to 0.13 mole/liter, and demineralised water, for 1 to 3 minutes, for example for approximately 1 minute 30 seconds. The surface can then be rinsed in ethanol for example, under ultrasound, and then in demineralised water and dried for example using hot air.

According to the invention, the next step is a step consisting of placing the degreased and stripped surfaces of the components in direct contact. This contact consists of placing or positioning the surfaces of the components to be assembled against each other, according to a desired stack. Preferentially, said contact is performed within a period of less than one hour following the step consisting of degreasing and stripping the surfaces to be assembled, so as to limit oxidation risks, except when special precautions have been taken to store the degreased and stripped components, said precautions possibly consisting of keeping the components in a clean and non-oxidising atmosphere such as nitrogen by placing in airtight bags. Said contact is said to be "direct", since it is carried out according to the present invention without placing an intermediate layer of an alloy such as those described in the prior art on the surfaces to be assembled.

According to the invention, the step following the contact of the surfaces of the components to be assembled is a step consisting of the diffusion welding assembly of the surfaces placed in direct contact. The diffusion welding may be performed for example by hot isostatic compression or by hot uniaxial pressing, for example, using conventional techniques known to those skilled in the art.

According to the invention, when the diffusion welding is performed by hot isostatic compression, the materials placed in contact may be introduced into a casing used to isolate the components to be assembled from the atmosphere and evacuate the casing for the diffusion welding assembly of the components in said casing. Of course, the contact step may also be performed directly in the casing.

According to the invention, the casing may be composed of any tight material, sufficiently resistant to withstand an at least partial vacuum in said casing, and to withstand the high temperatures and pressures required to assemble the components. For example, the casing may be a metal casing, for example made of stainless steel, soft steel or titanium and its alloys. It may be, for example, formed from a sheet with a thickness for example of approximately 1 to 20 mm, for example approximately 1 to 10 mm. Preferentially, the casing may mould the outside of the components to be assembled. In one embodiment according to the invention, the martensitic stainless steel components may close said casing by acting as a lid on the casing, it being possible to weld the steel component onto the casing. According to the invention, said casing may be produced by cutting, bending, if required, and welding a metal sheet or using any process known to those skilled in the art.

The casing is then degassed so as to create a vacuum inside it. The degassing may be performed by means of a vacuum pump or by heating the components to be assembled and the casing.

An example of degassing may consist of evacuating the envelope at ambient temperature until a residual vacuum less than or equal to 10 pa is obtained, and then heating the assembly at a moderate temperature, for example, below 300° C. for a few hours, for example 5 hours, while continuing the evacuation.

It may be useful to check that the casing is tight, before performing the diffusion welding operation, for example using a helium test.

Once the degassing step has been performed, the casing is rendered completely tight by sealing the opening used for its evacuation, the sealing being perform using a TIG weld, for example.

The components placed in contact in the degassed casing may then be assembled by diffusion welding. The assembly may be carried out in a hot isostatic compression chamber.

According to the invention, when the diffusion welding is performed using hot isostatic compression, the diffusion welding assembly step of the surfaces of the components placed in direct contact may comprise for example at least one heating and pressurisation cycle comprising:

an increase in temperature and pressure so as to reach a temperature chosen in a temperature range enabling the martensitic stainless steel to be placed in solution, and a pressure of approximately $5 \times 10^7$ to $2 \times 10^8$ Pa, stabilisation of the selected temperature and the pressure for a sufficient time to place the martensitic stainless steel of the corresponding component in solution, and a decrease in temperature and pressure.

According to the invention, for a martensitic stainless steel such as those mentioned above, the temperature range enabling the martensitic stainless steel to be placed in solution may be approximately 800 to 1080° C. The selected temperature may for example be approximately 975° C. The duration of each of the steps of this cycle may vary from a few minutes to a few hours. According to the invention, the temperature may be increased for 30 to 180 minutes, for example, for approximately 1 hour. The pressure may preferentially be $8 \times 10^7$ to $1.5 \times 10^8$ Pa.

The selected temperature and pressure may be kept stable for a time ranging from 30 to 120 minutes, for example for approximately one hour.

The temperature may be decreased so as to enable a martensitic conversion of the stainless steel component, which consists of quench hardening the steel. Said decrease in temperature may for example be for the stainless steel mentioned above 30 to 150° C./minute, between approximately 975° C. and 730° C., for example 110° C./minute, 15 to 75° C./minute between approximately 730° C. and 500° C., for example 40° C./minute, and more slowly below 500° C.

The temperature may also be decreased so as not to obtain a martensitic steel structure. Said decrease in temperature will then be followed by a quench hardening treatment to enable martensitic conversion of the steel.

According to the invention, the diffusion welding assembly of the components placed may also be performed by hot uniaxial pressing. The components to be assembled may be arranged in a press equipped with a heating system and a vacuum chamber. A vacuum of the order of approximately $10^{-1}$ to $10^{-3}$ Pa may then be set up in said chamber, the surfaces of the components to be assembled being in direct contact, in the press. The hot uniaxial pressing may be performed by applying a pressure ranging from approximately 1 to 100 MPa, for example from approximately 5 to 30 MPa. It may comprise at least one heating cycle comprising successively:

an increase in temperature so as to reach a temperature chosen in the temperature range enabling the martensitic stainless steel to be placed in solution, stabilisation of the temperature for a sufficient time to place the martensitic stainless steel in solution, and a decrease in temperature.

The temperatures and times of said cycle may be for example identical to those described for the hot isostatic compression for a steel such as that described above.

The assembly process according to the invention may also comprise an annealing treatment of the assembled martensitic stainless steel component. Said treatment is intended to soften the steel. It may be performed in a furnace, for example at a temperature from 500 to 800° C. according to the desired mechanical properties, for example at approximately 700° C.

Unexpectedly, the inventors observed that, when a diffusion welding assembly between copper and a martensitic stainless steel is produced with no intermediate material, the assembly produced in this way has an excellent thermal shock resistance. Said thermal shock resistance was demonstrated by the absence of degradation of the interface between the components assembled according to the process according to the invention after a series of several dozens of air heating operations, on the side of the martensitic stainless steel component, using an oxyacetylene welding torch up to a maximum temperature of approximately 900° C., each followed by quench hardening in water.

The assembly according to the invention is sufficiently resistant so that the quench hardening and annealing treatments, particularly intended for the martensitic conversion of the steel and the dissipation of the stress related to the assembly between the copper and steel, do not damage the assembly formed.

In addition, the assembly formed by the process according to the invention enables an excellent thermal transfer from one component to another.

In addition, not using an intermediate material such as those described in the prior art between the copper and martensitic stainless steel reduces the production cost of the assembly significantly by avoiding the addition of said materials, and the operations to coat and insert said material between the two components.

The process according to the invention also makes it possible to assemble components of any size or shape, for example volumes which may be greater than one $dm^3$ with copper and/or steel thicknesses of up to several centimeters. It also makes it possible to eliminate the technical difficulties of the prior art such as the difficulties related to handling large or heavy parts, difficulties related to obtaining a regular thickness of intermediate material on parts with complex shapes, difficulties related to the fragility of the coating for example to tearing for a coating in sheet form, rendering their positioning delicate, difficulties related to the coating's sensitivity to scratching, etc.

Another advantage is the possibility to incorporate in the assembly process according to the invention at least part of a thermal treatment intended to restore the properties of the martensitic steel, said part comprising at least the placing of the steel in solution and its quench hardening. This results in a reduction in additional costs since the post-treatment of the assembled part outside the hot isostatic compression chamber may be limited to annealing intended to soften the steel.

The process according to the invention can for example be applied to the production of metal parts operating at high temperatures, wherein the martensitic stainless steel part plays a role in the wear, corrosion or mechanical resistance, while the copper part acts as a thermal well, thus enabling the cooling of the part.

In addition, the present invention also relates to a process to produce a bimetal part comprising a martensitic stainless steel component assembled with a component comprising copper, said process comprising an assembly process according to the invention.

Said process can be used for example to produce a bimetal part such as a mould for the glass industry, a continuous metal strip casting roll, a non-cyclic or single-pole fluid-cooled generator, an X-ray tube, etc. with in particular all the advantages related to the present invention mentioned above.

The present invention also relates to a process to produce a bimetal part comprising a martensitic stainless steel component assembled with a component comprising copper, said process comprising in the following order:

- a step consisting of degreasing and stripping the surfaces of the martensitic stainless steel component to be assembled,
- a step consisting of depositing a powder of an alloy comprising copper in direct contact on the degreased and stripped surface of the martensitic stainless steel component,
- a step consisting of compacting the copper powder deposited on said degreased and stripped surface so as to form a component comprising copper with a surface in direct contact with the degreased and stripped surface, and
- a step consisting of diffusion welding assembly of the surfaces of the components in direct contact.

The step consisting of degreasing and stripping the surface of the martensitic stainless steel component may be for example the same as that described above.

The diffusion welding assembly step may comprise diffusion welding by hot isostatic compression or uniaxial pressing such as that described above. Said step may be followed if required by a step consisting of an annealing treatment of the assembled martensitic stainless steel.

According to this process, the diffusion welding assembly may be advantageously performed by hot isostatic compression due to the use of a powder, and also, for example, in the case of martensitic stainless steel components of complex shapes. In this case, the step consisting of depositing a powder of an alloy comprising copper in direct contact with the martensitic stainless steel component may be performed for example in a casing such as that described above.

Said step may for example consist of placing, in a casing, one or more martensitic stainless steel component(s) and filling said casing with a powder of the alloy comprising copper such that the steel component(s) is/are surrounded entirely by said powder in direct contact on one, or on all, of their surface(s) according to the bimetal parts to be produced.

Before the compacting step, the casing is degassed, as described above, and said degassing may last from a few hours to a few days, for example, two days.

According to this process, the copper alloy powder may be a powder composed of particles of a copper alloy such as those described above, said particles possibly having for example a diameter of 1 $\mu$m to 1 mm depending on the desired result.

Therefore, this process according to the invention makes it possible to compact a copper powder and perform the diffusion welding of said powder with a martensitic stainless steel at the same time, while this is difficult when an intermediate material is applied as in the prior art.

This process also offers the advantage of making it possible to obtain a bimetal part comprising a part made of copper alloy generally obtained by powder metallurgy. The densification of the powder during the assembly avoids the use of a previously densified copper component and this results in savings on component densification and machining costs.

The invention also relates to a thermomechanically resistant bimetal part comprising a martensitic stainless steel component assembled with a component comprising copper, wherein said components are assembled by direct diffusion welding, i.e. with no intermediate material, for example using a process according to the present invention, and to such a bimetal part wherein the assembled components have a thickness greater than or equal to approximately 1 mm on their assembled surfaces.

The present invention's other advantages and characteristics will be seen again upon reading the following examples which are of course given as an illustration and are not exhaustive.

EXAMPLES

In these examples, the martensitic stainless steel component is made of Z20 CN17-02 steel and the copper component is composed of electrolytic copper containing less than 200 ppm of oxygen. In addition, the surfaces of said components to be assembled are degreased and stripped chemically.

The degreasing is performed using a ternary acetone-ethanol-ether mixture in ⅓, ⅓, ⅓ proportions for both the steel and copper components. Said degreasing is followed by a rinse with demineralised water and drying with hot air.

The chemical stripping is performed using a solution containing 100 ml of 14 mol/l nitric acid, 20 ml of 23 mol/l hydrofluoric acid and 900 ml of water for the steel component and using a solution containing 62.5 mg of potassium dichromate of a purity greater than or equal to 99.5% by weight, 187 ml of 18 mol/l sulphuric acid and 625 ml of water for the electrolytic copper component.

Example 1

Diffusion Welding Assembly by Hot Isostatic Compression with Martensitic Conversion After degreasing and stripping the components to be assembled using the method described below, the components are introduced in direct contact with no intermediate coating between them, in a casing produced using stainless austenitic steel sheets by cutting, bending and welding. The casing is closed by a peripheral TIG weld. A stainless steel pip is used to perform degassing in the casing up to a pressure of 1 Pa at 250° C. over night.

The casing and its contents are then subjected to a hot isostatic compression cycle comprising an increase for one hour at 975° C. and $10^8$ Pa, a stabilised phase, of one hour under these conditions and a decrease at an average rate of 110° C. per minute between 975° C. and 730° C., 40° C. per minute between 730° C. and 500° C. and more slowly below 500° C. This decrease is sufficiently rapid to induce a martensitic conversion in the steel. After this cycle, the casing and its contents are subjected to annealing in a furnace intended to soften the steel.

The assembly produced in this way has an excellent resistance to thermal shock, which is evaluated by the absence of degradation of the interface between the assembled materials after a series of several dozen air heating operations on the steel side using an oxyacetylene welding torch, up to a maximum temperature of approximately 900° C., each followed by quench hardening with water.

Example 2

Diffusion Welding Assembly by Hot Isostatic Compression Followed by Martensitic Conversion This example relates to the same application as in example 1, but the martensitic conversion of the steel is performed after assembly. The parts undergo the same surface preparation and are conditioned in the same way in a casing. The hot isostatic compression cycle is performed at 930° C. instead of 975° C. and the drop lasts two hours. The steel does not have an entirely martensitic structure after assembly. The parts are subjected after hot isostatic compression to a thermal treatment comprising, firstly, heating at 975° C. followed by quench hardening with water and, secondly, annealing.

The assembly produced in this way has all the characteristics described in the disclosure and the above examples.

Example 3

Diffusion Welding Assembly by Hot Uniaxial Pressing

After degreasing and stripping the components to be assembled using the method described above, the components are introduced into a chamber of a hot uniaxial press, the surfaces of said components to be assembled being placed in direct contact, with no intermediate coating. A vacuum of the order of 10 to $10^{-3}$ Pa is obtained in said chamber.

The temperature cycle is identical to that in example 1 or example 2.

The pressure applied by the press is 10 MPa.

The duration of the cycle of the same order of magnitude as that of the hot isostatic compression.

The assembly obtained in this way has the same properties as those obtained in examples 1 and 2.

Example 4

Production of Bimetal Parts

The bimetal parts produced in this example are cylindrical glassware mould blanks each composed of an electrolytic copper component containing less than 200 ppm of oxygen and a Z20 CN17-02 martensitic stainless steel component. The diameter of these components is 300 mm, the thickness of the steel component varies from 2 to 10 cm and the thickness of the copper component varies from 5 to 13 cm.

These components undergo degreasing and stripping such as those described above and are placed in direct contact in a casing such as that described in examples 1 and 2 above.

Part of these parts are assembled by diffusion welding by hot isostatic compression such as that described in example 1 or 2 and another part by hot uniaxial pressing such as that described in example 3.

The bimetal parts obtained have all the assembly characteristics described in the disclosure and in the examples above.

What is claimed is:

1. Assembly process of a martensitic stainless steel component with a component comprising copper, said process comprising in the following order:
    a step consisting of degreasing and stripping the surfaces of the components to be assembled,
    a step consisting of placing the degreased and stripped surfaces of the components to be assembled in direct contact with each other so that there is no intermediate layer of welding material between the surfaces of the components, and
    a step consisting of diffusion welding assembly of the surfaces of the components in contact, by hot isostatic compression or by hot uniaxial pressing.

2. Process to produce a bimetal part comprising a component made of martensitic stainless steel assembled with a component comprising copper, said process comprising an assembly process according to claim 1.

3. Process according to claim 1, wherein the martensitic steel comprises nickel at a concentration less than or equal to 4% by weight.

4. Process according to any of claim 1, wherein the martensitic steel comprises chromium at a concentration greater than or equal to 10% by weight.

5. Process according to claim 1 wherein the component comprising copper is composed of a copper alloy reinforced by oxide dispersion.

6. Process according to claims 1, wherein the component comprising copper is a component comprising at least 99.8% of copper by weight.

7. Process according to claim 1, wherein the components to be assembled have a thickness greater than or equal to 1 mm on their surface to be assembled.

8. Process according to claim 1, wherein the diffusion welding assembly being performed by hot isostatic compression, it comprises at least one heating and pressurisation cycle comprising successively:
    an increase in temperature and pressure so as to reach a temperature chosen in a temperature range enabling the martensitic stainless steel to be placed in solution, and a pressure of approximately $5 \times 10^7$ to $2 \times 10^8$ Pa,
    stabilisation of the selected temperature and the pressure for a sufficient time to place the martensitic stainless steel of the corresponding component in solution, and
    a decrease in temperature and pressure.

9. Process according to claim 1, wherein the diffusion welding assembly being performed by uniaxial pressing, it comprises at least one heating and pressurisation cycle comprising successively:
    an increase in temperature so as to reach a temperature chosen in the temperature range enabling the martensitic stainless steel to be placed in solution,
    stabilisation of the temperature for a sufficient time to place the martensitic stainless steel in solution, and
    a decrease in temperature.

10. Process according to claim 8, wherein the decrease in temperature is sufficiently rapid to obtain a martensitic structure of the stainless steel component.

11. Process according to claim 8, wherein the decrease in temperature not enabling the production of an entirely martensitic structure, said decrease in temperature is followed by a quench hardening treatment to enable martensitic conversion of the steel.

12. Process according to claim 1, also comprising a step consisting of an annealing treatment of the assembled martensitic stainless steel component.

13. Process to produce a bimetal part comprising a martensitic stainless steel component assembled with a component comprising copper, said process comprising in the following order:
    a step consisting of degreasing and stripping the surfaces of the martensitic stainless steel component to be assembled,
    a step consisting of depositing a powder of an alloy comprising copper in direct contact on the degreased and stripped surface of the martensitic stainless steel component,
    a step consisting of compacting the copper powder deposited on said degreased and stripped surface so as to form a component comprising copper with a surface in direct contact with the degreased and stripped surface so that there is no intermediate layer of welding material between the surface of the component comprising copper and the surface of the martensitic stainless steel component, and a step consisting of diffusion welding assembly of the surfaces of the components in direct contact, by hot isostatic compression or by hot uniaxial pressing.

14. Process according to claim 13, wherein the martensitic steel comprises nickel at a concentration less than or equal to 4% by weight.

15. Process according to claim 13, wherein the martensitic steel comprises chromium at a concentration greater than or equal to 10% by weight.

16. Process according to claim 4, wherein the component comprising copper is composed of a copper alloy reinforced by oxide dispersion.

17. Process according to claim 4, wherein the component comprising copper is a component comprising at least 99.8% of copper by weight.

18. Process according to claim 17, wherein the components to be assembled have a thickness greater than or equal to 1 mm on their surface to be assembled.

19. Process according to claim 9, wherein the decrease in temperature is sufficiently rapid to obtain a martensitic structure of the stainless steel component.

20. Process according to claim 9, wherein the decrease in temperature not enabling the production of an entirely martensitic structure, said decrease in temperature is followed by a quench hardening treatment to enable martensitic conversion of the steel.

21. Process according to claim 11, also comprising a step consisting of an annealing treatment of the assembled martensitic stainless steel component.

* * * * *